US005200595A

United States Patent [19]

Boulos et al.

[11] Patent Number: 5,200,595

[45] Date of Patent: Apr. 6, 1993

[54] HIGH PERFORMANCE INDUCTION PLASMA TORCH WITH A WATER-COOLED CERAMIC CONFINEMENT TUBE

[75] Inventors: Maher I. Boulos; Jerzy Jurewicz, both of Sherbrooke, Canada

[73] Assignee: Universite de Sherbrooke, Quebec, Canada

[21] Appl. No.: 684,179

[22] Filed: Apr. 12, 1991

[51] Int. Cl.[5] .................... B23K 9/00

[52] U.S. Cl. .................... 219/121.52; 210/121.49; 210/121.48; 315/111.51

[58] Field of Search .................... 219/121.48, 121.52, 219/121.49, 75; 315/111.21, 111.51

[56] References Cited

U.S. PATENT DOCUMENTS

| | | | |
|---|---|---|---|
| 3,296,410 | 1/1967 | Hedger | 219/121.52 |
| 3,378,917 | 4/1968 | Lapham | 219/10.79 |
| 3,694,618 | 9/1972 | Poole et al. | 219/121.52 |
| 3,763,392 | 10/1973 | Hollister | 315/111.51 |
| 3,862,393 | 1/1975 | Mullen et al. | 315/111.51 |
| 4,431,901 | 2/1984 | Hull | 219/121.52 |
| 4,795,879 | 1/1989 | Hull et al. | 219/121.52 |
| 4,874,916 | 10/1989 | Burke | 219/10.79 |

FOREIGN PATENT DOCUMENTS

| | | |
|---|---|---|
| 1345152 | 10/1963 | France . |
| 1061956 | 3/1967 | United Kingdom . |

OTHER PUBLICATIONS

High-frequency induction discharge in a chamber with water-cooled metal walls Donskoi et al.-Teplofizika Vysokikh Temperatur, vol. 3, No. 6, Nov. Dec. 1965.

Investigation of plasma torch of high-frequency argon burner-Goldfarb et al. Fizika Vysokikh Temperatur, vol. 5 No. 4, pp. 549-556, Jul.-Aug. 1967.

Induction plasma torches-Jordan, G. R.-Rev. Phys. Technical (G.B.) vol. 2, No. 3, pp. 128-145 1971.

Dossier Plasma-J. Van den Broek-Journal francais de l'électrothermie No. 37-Jan.-Feb. 1989.

Peculiarities of spraying coatings with a radio-frequency induction plasmatron Babaevski et al.-10th International Thermal Spraying Conference-Essen May 2-6, 1983.

Analysis of an RF Induction Plasma Torch with a Permeable Ceramic Wall Mostaghimi et al., JAVAD--Chemical Engineering, doc. 9-0650, Oct. 1989.

A radiatively cooled torch for ICP-AES using 1 1 min-1 of argon van der Plas et al. Spectrochimica Acta vol. 39B Nos. 9-11, pp. 1161-1169 1984.

An evaluation of ceramic materials for use in non--cooled low-flow ICP torches, van der Plas et al., Spectrochimica Acta vol. 42B Nos. 11-12, p. 1205-1216 1987.

*Primary Examiner*—Mark H. Paschall
*Attorney, Agent, or Firm*—Longacre & White

[57] ABSTRACT

A high performance induction plasma torch comprises a cylindrical torch body made of cast ceramic or composite polymer, a coaxial cylindrical plasma confinement tube located inside the torch body, a gas distributor head secured to one end of the torch body to supply the confinement tube with gaseous substances, a cylindrical and coaxial induction coil completely embedded in the ceramic or polymer material of the torch body, and a thin annular chamber separating the coaxial torch body and confinement tube. This confinement tube can be made of pure or composite ceramic materials based on sintered or reaction bonded silicon nitride, boron nitride, aluminum nitride or alumina, or any combinations of them with varying additives and fillers. The annular chamber is about 1 mm thick and high velocity cooling water flows therein to efficiently cool the plasma confinement tube.

12 Claims, 1 Drawing Sheet

HIGH PERFORMANCE INDUCTION PLASMA TORCH WITH A WATER-COOLED CERAMIC CONFINEMENT TUBE

BACKGROUND OF THE INVENTION

1. Field of the Invention

The present invention is concerned with the field of induction plasma torches and relates more specifically to a plasma torch of which the performance is improved by using a plasma confinement tube made of ceramic material and cooled through a high velocity fluid flowing into a thin annular chamber enveloping the outer surface of that tube.

2. Brief Description of the Prior Art

Induction plasma torches have been known since the early sixties. Their basic design has however been substantially improved over the past thirty years. Examples of prior plasma torch designs are described in British patent No. 1,061,956 (Cleaver) published on Mar. 15, 1967, in U.S. Pat. No. 3,694,618 (Poole et al.) dated Sep. 26, 1972, and in U.S. Pat. No. 3,763,392 (Hollister) of Oct. 2, 1973. The basic concept of an induction plasma torch involves an induction coupling of the energy into the plasma using a 4–6 turns induction coil. A gas distributor head is used to create a proper flow pattern into the region of the produced plasma, which is necessary to stabilize the plasma confined in a tube usually made of quartz, to maintain the plasma in the center of the coil and protect the plasma confinement tube against damage due to the high heat load from the plasma. At relatively high power levels (above 5–10 kW), additional cooling is required to protect the plasma confinement tube. This is usually achieved through dionized water flowing on the outer surface of the tube.

Numerous attempts have been made to improve the protection of the plasma confinement tube. These tentatives are concerned with the use of (a) a protective segmented metallic wall insert inside the plasma confinement tube [U.S. Pat. No. 4,431,901 (Hull) issued on Feb. 14, 1984], (b) porous ceramic to constrict the plasma confinement tube [J. Mostaghimi, M. Dostie, and J. Jurewicz, "Analysis of an RF induction plasma torch with a permeable ceramic wall", Can. J. Chem. Eng., 67, 929–936 (1989)], and (c) radiatively cooled ceramic plasma confinement tubes [P. S. C. Van der Plas and L. de Galan, "A radiatively cooled torch for ICP-AES using 1 liter per min of argon", Spectrochemica Acta, 39B, 1161–1169 (1984) and P. S. C. Van der Plas and L. de Galan, "An evaluation of ceramic materials for use in non-cooled low flow ICP torches", Spectrochemica Acta, 42B, 1205–1216 (1987)]. These attempts each present their respective limitations and shortcomings.

The use of a segmented metallic wall insert to improve protection of the plasma confinement tube present the drawback of substantially reducing the overall energy efficiency of the plasma torch.

It has been found that a plasma confinement tube made of porous ceramic material offers only limited protection.

Concerning the radiatively cooled confinement tubes, their ceramic materials must withstand the relatively high operating temperatures, exhibit an excellent thermal shock resistance and must not absorb the RF (radio frequency) field. Most ceramic materials fail to meet with one or more of these stringent requirements.

OBJECTS OF THE INVENTION

An object of the present invention is therefore to eliminate the above discussed drawbacks of the prior art.

Another object of the subject invention is to improve the protection of a plasma confinement tube made of ceramic material.

A third object of the invention is to provide a plasma torch with a confinement tube made of ceramic material and to cool this plasma confinement tube by means of a high velocity cooling fluid flowing into a thin annular chamber surrounding the outer surface of the confinement tube.

SUMMARY OF THE INVENTION

More specifically, in accordance with the present invention, there is provided an induction plasma torch, comprising:

a plasma confinement tube in which plasma is produced, this confinement tube being made of ceramic material, and defining inner and outer surfaces and first and second ends;

a gas distributor head disposed at the first end of the plasma confinement tube for supplying at least one gaseous substance into this confinement tube, the gaseous substance(s) flowing through the confinement tube from its first end toward its second end;

an inductive coupling member for inductively applying energy to the gaseous substance(s) flowing through the confinement tube in order to produce and sustain plasma in this tube; and a thin annular chamber surrounding the outer surface of the plasma confinement tube and in which a high velocity flow of cooling fluid can be established to cool this tube.

In accordance with preferred embodiments of the invention, (a) the plasma confinement tube is made of pure or composite ceramic materials based on sintered or reaction bonded silicon nitride, boron nitride, aluminum nitride and alumina, or any combinations of them with varying additives and fillers, presenting a high thermal conductivity, a high electrical resistivity and a high thermal shock resistance, (b) the induction plasma torch comprises a tubular torch body and the plasma confinement tube is disposed within this body, (c) the outer surface of the plasma confinement tube and the inner surface of the tubular torch body define the thin annular chamber, having a thickness of about 1 mm, and (d) the tubular torch body, plasma confinement tube and thin annular chamber are cylindrical and coaxial.

As the ceramic material of the plasma confinement tube is characterized by a high thermal conductivity, the high velocity of the cooling fluid flowing through the thin annular chamber provides a high heat transfer coefficient required to properly cool the plasma confinement tube. The intense and efficient cooling of the outer surface of the plasma confinement tube enables production of plasma at much higher power and temperature levels at lower gas flow rates. This also causes higher specific enthalpy levels of the gases at the exit of the plasma torch.

Preferably, the torch body is made of cast ceramic or composite polymer and the inductive coupling member comprises a cylindrical induction coil coaxial with the plasma confinement tube and completely embedded into the ceramic or polymer material of the torch body.

As the induction coil is embedded in the cast ceramic or composite polymer of the torch body, the spacing between this coil and the plasma confinement tube can be accurately controlled to improve the energy coupling efficiency between the coil and the plasma. This also enables accurate control of the thickness of the annular chamber, without any interference caused by the induction coil, which control is obtained by machining to low tolerance the inner surface of the torch body and the outer surface of the plasma confinement tube.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 1:
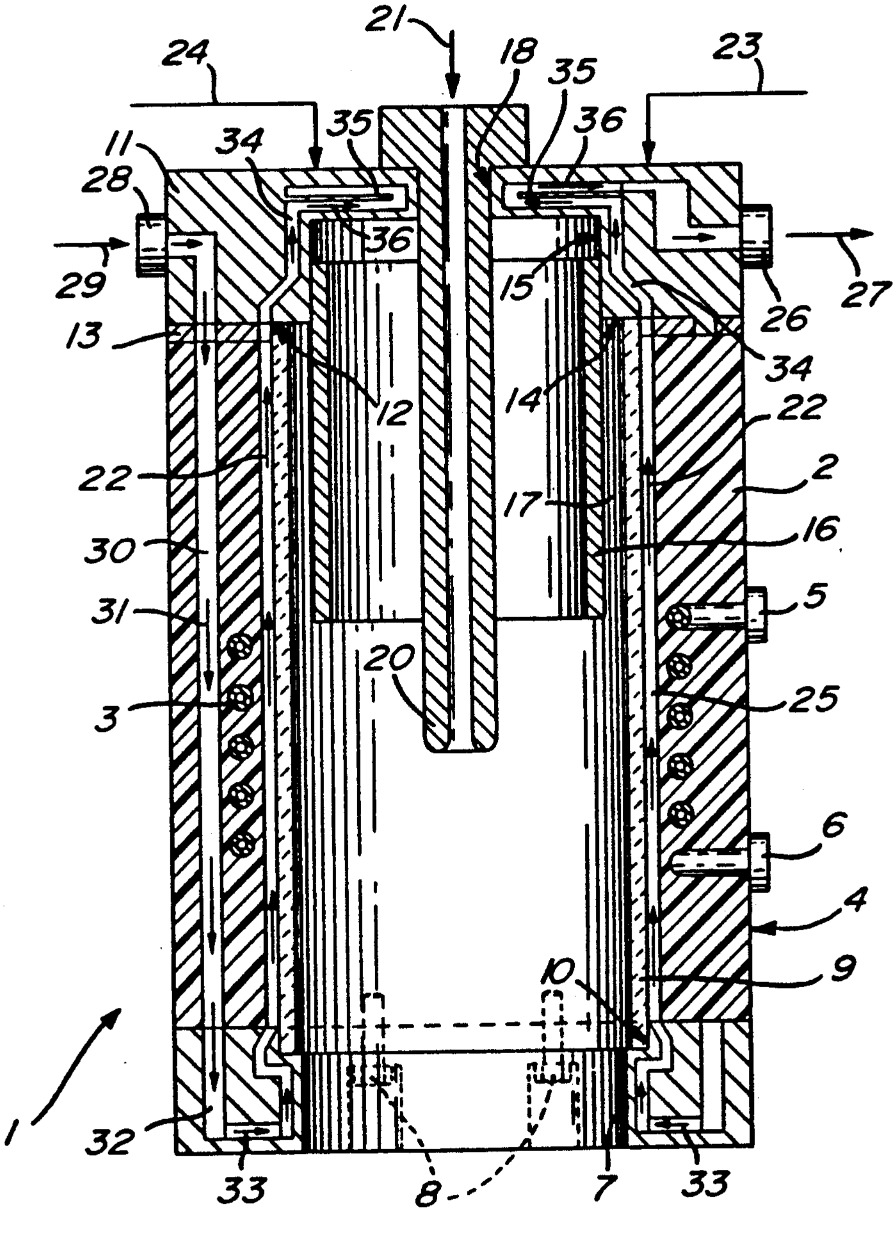
FIG. 1 is an elevational, cross sectional view of a high performance induction plasma torch in accordance with the present invention.

In FIG. 1 of the drawings, the high performance induction plasma torch in accordance with the present invention is generally identified by the reference numeral 1.

The plasma torch 1 comprises a cylindrical torch body 2 made of a cast ceramic or composite polymer. An induction coil 3, made of water-cooled copper tube, is completely embedded in the torch body 2 whereby positional stability of this coil is assured. The two ends of the induction coil 3 both extend to the outer surface 4 of the torch body 2 and are respectively connected to a pair of electric terminals 5 and 6 through which cooling water and an RF current can be supplied to this coil 3. As can be seen, the torch body 2 and the induction coil 3 are cylindrical and coaxial.

A plasma exit nozzle 7 is cylindrical and is attached to the lower end of the torch body 2 through a plurality of bolts such as 8. As illustrated in FIG. 1, the nozzle 7 has an outer diameter corresponding substantially to that of the torch body 2, and an inner diameter generally corresponding to the inner diameter of a plasma confinement tube 9, made of ceramic material and mounted inside the torch body 2, coaxially therewith. The exit nozzle 7 is formed with an upper, inner right angle seat 10 to receive the lower end of the confinement tube 9.

A gas distributor head 11 is fixedly secured to the upper end of the torch body 2 by means of a plurality of bolts (not shown), similar to the bolts 8. A flat disk 13 is interposed between the torch body 2 and the gas distributor head 11. It is equipped with O-rings to seal the joint with the body 2 and head 11. The disk 13 has an inner diameter slightly larger than the outer diameter of the confinement tube 9 to form with the underside 14 of the head 11 a right angle seat 12 capable of receiving the upper end of the tube 9.

The gas distributor head 1 also comprises an intermediate tube 16. A cavity is formed in the underside 14 of the head 11, which cavity defines a cylindrical wall 15 of which the diameter is dimensioned to receive the upper end of the intermediate tube 16. The tube 16 is shorter and smaller in diameter than the tube 9, and it is cylindrical and coaxial with the body 2, tube 9 and coil 3. A cylindrical cavity 17 is accordingly defined between the intermediate 16 and confinement 9 tubes.

The gas distributor head 11 is provided with a central opening 18 through which a tubular, central powder injection probe 20 is introduced. The probe 20 is elongated and coaxial with the tubes 9 and 16, the coil 3 and body 2.

Powder and a carrier gas (arrow 21) are injected in the torch 1 through the probe 20. The powder transported by the carrier gas and injected through the central tube constitutes a material to be molten or vaporized by the plasma, as well known in the art.

The gas distributor head 11 comprises conventional conduit means (not shown) suitable to inject a sheath gas in the cylindrical cavity 17 (arrow 23) and to cause a longitudinal flow of this gas over the inner surface of the confinement tube 9.

The gas distributor head 11 also comprises conventional conduit means (not shown) adequate to inject a central gas inside the intermediate tube 16 (arrow 24) and to cause a tangential flow of this central gas.

It is believed to be within the skill of an expert in the art to select (a) the structure of the powder injection probe 20 and of the conduit means (arrows 23 and 24) through which the central and sheath gases are injected, (b) the nature of the powder, carrier gas, sheath gas and central gas, and (c) the materials of which are made the exit nozzle 7, the gas distributor head 11 and its intermediate tube 16, and the disk 13, and accordingly these elements will not be further described in the present specification.

As illustrated in FIG. 1, a thin (≈1 mm thick) annular chamber 25 is defined between the inner surface of the torch body 2 and the outer surface of the confinement tube 9. High velocity cooling water flows in the thin annular chamber 25 over the outer surface of the tube 9 (arrows such as 22) to cool this confinement tube of which the inner surface is exposed to the high temperature of the plasma.

The cooling water (arrow 29) is injected in the thin annular chamber 25 through an inlet 28, a conduit 30 made in the head 11, disk 13 and body 2 (arrows such as 31), and annular conduit means 32, generally U-shaped in cross section and structured to transfer the water from the conduit 30 to the lower end of the annular chamber 25. As can be seen, the water flows along the inner surface of the exit nozzle 7 to efficiently cool this surface which is exposed to the heat produced by the plasma.

The cooling water from the upper end of the thin annular chamber 25 is transferred to an outlet 26 (arrow 27) through two parallel conduits 34 formed in the gas distribution head 11 (arrows such as 36). A wall 35 is also formed in the conduits 34 to cause flowing of cooling water along the inner surface of the head 11 and thereby efficiently cool this inner surface.

In operation, the inductively coupled plasma is generated by applying an RF current in the induction coil 3 to produce an RF magnetic field in the confinement tube 9. The applied field induces Eddy currents in the ionized gas and by means of Joule heating, a stable plasmoid is sustained. The operation of an induction plasma torch, including ignition of the plasma, is believed to be well known in the art and does not need to be described in further detail in the present specification.

The ceramic material of the plasma confinement tube 9 can be pure or composite ceramic materials based on sintered or reaction bonded silicon nitride, boron nitride, aluminum nitride and alumina, or any combinations of them with varying additives and fillers. This ceramic material is dense and characterized by a high thermal conductivity, a high electrical resistivity and a high thermal shock resistance.

As the ceramic body of the plasma confinement tube 9 presents a high thermal conductivity, the high velocity of the cooling water flowing in the thin annular chamber 25 provides a high heat transfer coefficient suitable and required to properly cool the plasma confinement tube 9. The intense and efficient cooling of the outer surface of the plasma confinement tube 9 enables production of plasma at much higher power at lower gas flow rates than normally required in standard plasma torches comprising a confinement tube made of quartz. This causes in turn higher specific enthalpy levels of the gases at the exit of the plasma torch.

As can be appreciated, the very small thickness ($\approx 1$ mm) of the annular chamber 25 plays a key role in increasing the velocity of the cooling water over the outer surface of the confinement tube 9 and accordingly to reach the required high thermal transfer coefficient.

The induction coil 3 being completely embedded in the cast ceramic or composite polymer of the torch body 2, the spacing between the induction coil 3 and the plasma confinement tube 9 can be accurately controlled to improve the energy coupling efficiency between the coil 3 and the plasma. This also enables accurate control of the thickness of the annular chamber 25, without any interference caused by the induction coil 3, which control is obtained by machining to low tolerance the inner surface of the torch body 2 and the outer surface of the plasma confinement tube 9.

It should be pointed out that, in order to successfully realize the induction plasma torch in accordance with the present invention, one must take into consideration a number of critical factors having a direct influence on the torch performance. These factors can be summarized as follows:

The quality of the plasma confinement tube 9 is of critical importance since it is closely related to the requirements of high thermal conductivity, high electrical resistivity and high thermal shock resistance. Although a tube 9 made of sintered silicon nitride has been successfully tested, the present invention is not limited to the use of this ceramic material but also encompasses the use of other materials either pure or composite provided that they satisfy the above stringent requirements. For example, boron nitride, aluminum nitride or alumina composites constitute possible alternatives.

It is a critical requirement of accurately controlling the small thickness of the annular chamber 25 between the torch body 2 and the plasma confinement tube 9, and the outer surface of the ceramic tube 9 and the inner surface of the torch body 2 have therefore to be machined to low tolerance. Moreover, as the induction coil 3 is embedded in the body 2 made of cast ceramic or composite polymer, this body 2 must be machined to low tolerance on its inner surface to ensure its concentricity with the plasma confinement tube 9.

The quality of the cooling water, and its velocity over the outer surface of the plasma confinement tube 9 are also of critical importance to carry out efficient cooling of this tube 9 and protection thereof against the high thermal fluxes to which it is exposed by the plasma.

Although the present invention has been described hereinabove by way of a preferred embodiment thereof, this embodiment can be modified at will, within the scope of the appended claims, without departing from the spirit and nature of the subject invention.

What is claimed is:

1. An induction plasma torch comprising:

a tubular torch body including a machined cylindrical inner surface having a first diameter;

a plasma confinement tube (a) made of ceramic material having a high thermal conductivity, and (b) including a first end, a second end, and a machined cylindrical outer surface having a second diameter slightly smaller than said first diameter;

the plasma confinement tube being mounted within said tubular torch body, and the cylindrical inner and outer surfaces being coaxial to define between said inner and outer surfaces a thin annular chamber of uniform thickness;

a gas distributor head mounted on the torch body at the first end of the plasma confinement tube for supplying at least one gaseous substance into said confinement tube, said at least one gaseous substance flowing through the plasma confinement tube from its first end toward its second end;

an induction coil coaxial with said cylindrical inner and outer surfaces, embedded in the torch body, and supplied with an electric current for inductively applying energy to said at least one gaseous substance flowing through the plasma confinement tube in order to produce and sustain a high temperature plasma in said confinement tube; and means for establishing a high velocity flow of cooling fluid in the thin annular chamber, the high thermal conductivity of the ceramic material forming the confinement tube and the high velocity flow of cooling fluid both contributing in efficiently transferring heat from the plasma confinement tube, heated by said high temperature plasma, into the cooling fluid to thereby efficiently cool said confinement tube.

2. The plasma torch of claim 1, in which the said ceramic material comprises silicon nitride.

3. The plasma torch of claim 1, in which the said ceramic material comprises sintered or reaction bonded silicon nitride including at least one additive and/or filler.

4. The plasma torch of claim 1, wherein the said ceramic material is selected from the group consisting of boron nitride, aluminum nitride, and alumina.

5. The plasma torch of claim 1, in which the said ceramic material is a dense ceramic material having a high thermal conductivity, a high electrical resistivity and a high thermal shock resistance.

6. The plasma torch of claim 1, in which the said annular chamber has a thickness of about 1 mm.

7. The plasma torch of claim 1, wherein the said cooling fluid comprises water.

8. The plasma torch of claim 1, wherein the high velocity flow of cooling fluid is parallel to the common axis of said cylindrical inner and outer surfaces.

9. The plasma torch of claim 1, in which the said torch body is made of a cast composite polymer in which the induction coil is completely embedded.

10. The plasma torch of claim 1, in which the said torch body is made of a cast ceramic in which the induction coil is completely embedded.

11. The plasma torch of claim 1, wherein the said induction coil is made of an electrically conductive tube supplied with a cooling fluid to cool the said induction coil.

12. The plasma torch of claim 1, wherein the said plasma torch further comprises a plasma exit nozzle mounted on the torch body at the second end of the plasma confinement tube, wherein the said head and nozzle each comprise an inner surface, and wherein the high velocity flow establishing means comprise conduit means in the gas distributor head and the plasma exit nozzle, said cooling fluid flowing at high velocity through the said conduit means which are so positioned as to allow the cooling fluid to cool the inner surfaces of said head and nozzle.

* * * * *